United States Patent [19]

Butz

[11] 4,029,179
[45] June 14, 1977

[54] DISK BRAKE WITH AXIALLY FLOATING CASING

[75] Inventor: Hans Butz, Schwebheim, Germany

[73] Assignee: Fichtel & Sachs A.G., Schweinfurt am Main, Germany

[22] Filed: May 19, 1976

[21] Appl. No.: 687,696

[30] Foreign Application Priority Data

May 22, 1975 Germany .......................... 2522622

[52] U.S. Cl. ................................ 188/71.8; 188/26; 188/72.7; 188/196 B
[51] Int. Cl.² ........................ B62L 1/02; F16D 55/08
[58] Field of Search .................. 188/26, 71.1, 71.8, 188/71.9, 72.7, 196 B, 205 R, 72.3, 72.8, 79.5 K, 73.3, 216

[56] References Cited

UNITED STATES PATENTS

| | | | |
|---|---|---|---|
| 3,155,195 | 11/1964 | Brawerman | 188/71.9 |
| 3,433,333 | 3/1969 | Swift | 188/196 B |
| 3,701,400 | 10/1972 | Burnett et al. | 188/72.8 X |
| 3,765,511 | 10/1973 | Toyomasu | 188/72.7 X |

Primary Examiner—Trygve M. Blix
Assistant Examiner—Douglas C. Butler
Attorney, Agent, or Firm—Hans Berman

[57] ABSTRACT

The supporting structure of a disk brake for a bicycle includes a tubular guide bounding a cylindrical, axially open passage in which first and second actuator members are axially movable, the first member being moved angularly by an operating device while the second member is secured against angular movement and moved axially by an interposed cam mechanism in response to the angular movement of the first member. A casing mounted on the first actuator member for limited axial movement partly envelopes the guide. An opening in the casing in a plane transverse to the axis receives a disk attached to the wheel to be braked for axial engagement between brake linings on the casing and the second actuator member respectively when the first actuator member is moved by the operating device.

10 Claims, 3 Drawing Figures

DISK BRAKE WITH AXIALLY FLOATING CASING

This invention relates to disk brakes, and particularly to a disk brake suitable for bicycles and like vehicles in which pads of brake lining engage only a circumferentially narrow section of a brake disk.

It is an object of this invention to provide a disk brake of the type described which is simple and correspondingly inexpensive to manufacture, yet reliable in its operation even without preventive maintenance.

With this object and others in view, as will hereinafter become apparent, the invention provides a disk brake whose supporting structure includes a tubular guide bounding an axially open passage of circular cross section. A brake disk is mounted on the supporting structure for rotation in a plane transverse to the axis of the passage in which first and second actuator members are mounted for axial movement. Operating means permit the first actuating member to be moved angularly about the axis while the second actuator member is secured against such angular movement. An interposed cam device moves the second actuator member axially in the passage in response to angular movement of the first member. A casing mounted on the first actuator member for limited axial movement partly envelops the guide. An opening in the casing receives a portion of the disk. Engagement devices on the casing and the second actuator member have respective faces which clamp the disk therebetween in the opening of the casing for braking engagement.

Other features, additional objects, and many of the attendant advantages of this invention will readily be appreciated as the same becomes better understood by reference to the following detailed description of preferred embodiments when considered in connection with the appended drawing in which.

Figure 1:
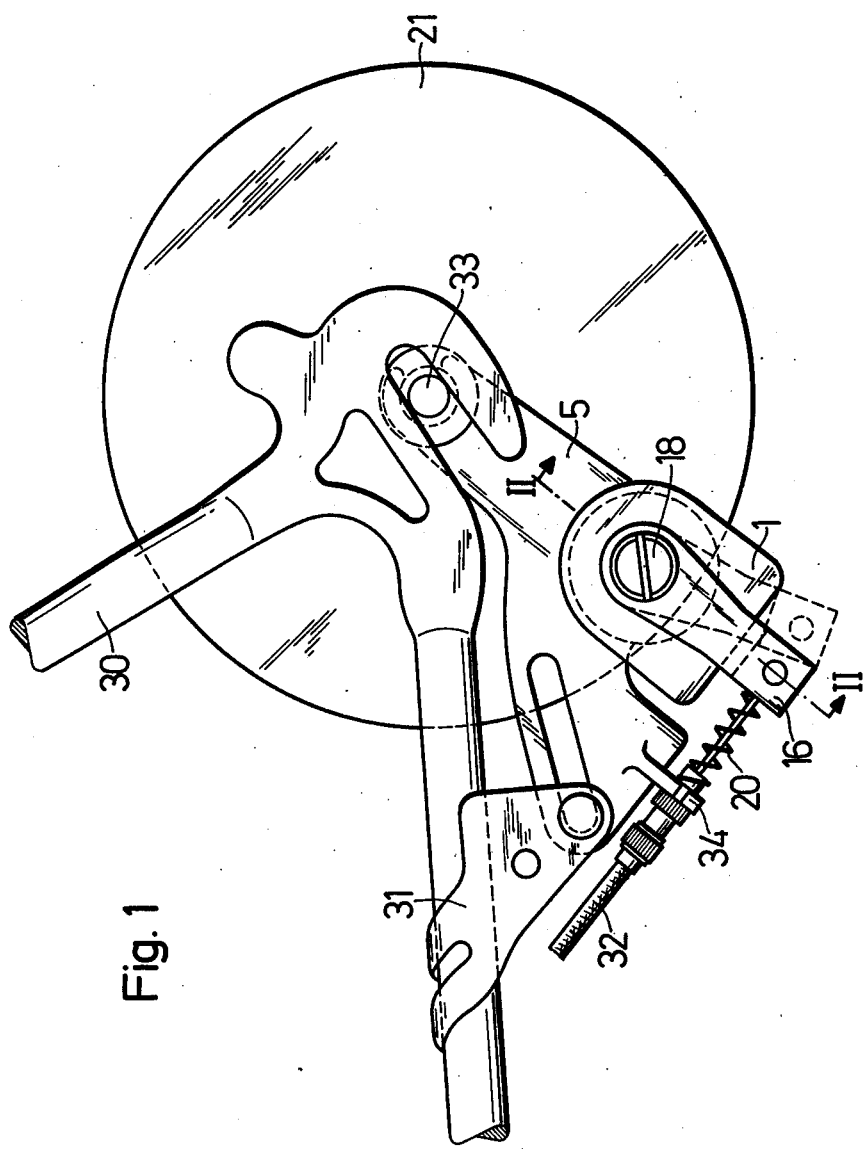
FIG. 1 shows a bicycle equipped with the disk brake of this invention in fragmentary side elevation.

Referring now to the drawings in detail, and initially to FIG. 1, there is shown only as much of an otherwise conventional bicycle as is needed for an understanding of this invention. The frame 30 of the bicycle carries the fixed shaft 33 of the rear wheel, not itself shown, to which a brake disk 21 is fixedly fastened, as is conventional and not illustrated. A bracket 5 extends obliquely downward and forward from the shaft 33 and is secured to the frame 30 in fixed angular relationship to the shaft by a pipe clamp 31. The brake elements engageable with the disk 21 are concealed in a casing 1 and are operated by an arm 16 attached to the elements by a shoulder screw 18. The arm 16 is held manually in the fully drawn braking position by a Bowden cable 32 whose tubular outer member abuts against a lug 34 on the bracket 5. A helical compression spring 20 coiled about the inner member of the Bowden cable 32 abuts against the lug 34 and the arm 16 tends to shift the arm toward the brake releasing position shown in broken lines in which the arm abuts against the casing 1.

Figure 2:
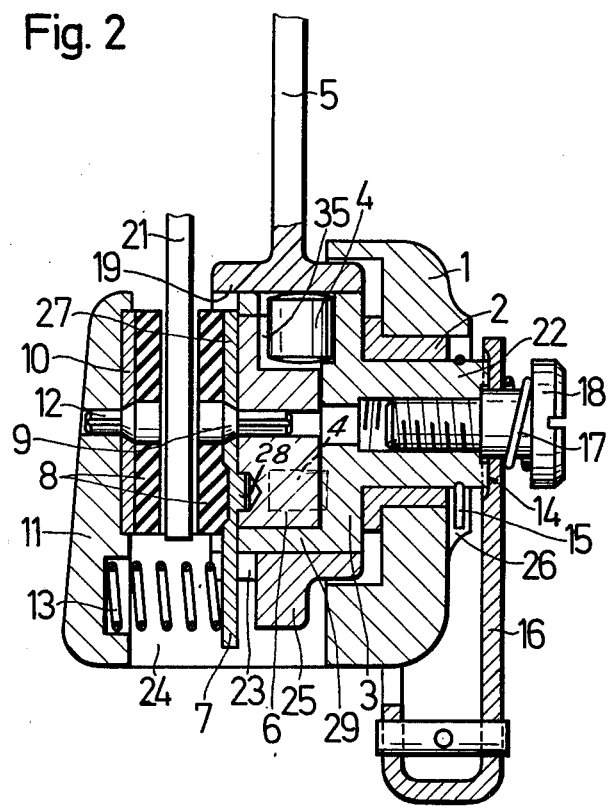
FIG. 2 illustrates the disk brake of FIG. 1 section on the line II—II in the released condition.

The novel features of the disk brake are better seen in FIG. 2. The bracket 5 which, for the purpose of the specification, is a portion of the fixed supporting structure of the bicycle is integral with a guide sleeve 19 whose axial length, parallel to the shaft 33, is short as compared to the diameter of the cylindrical passage in the sleeve. An axially terminal portion of the guide sleeve 19 is received in the casing.

A coaxial bore of the casing 1 receives a flanged bearing bushing 2 and a tubular part 22 of a first actuator member 3 rotatable in the bushing 2. The aforementioned shoulder screw 18 is threadedly received in the bore of the actuator part 22. The operating arm 16 is rotatably mounted on the smoothly cylindrical shank portion of the screw 18. Radially elongated ribs and recesses 14 on opposite faces of the arm 16 and the actuator part 22 are normally held engaged by a helical compression spring 17 whose ends abut against the arm 16 and the head of the screw 18. Angular movement of the actuator member 3 is limited by the braking action of a wire spring 15 having a circularly arcuate portion frictionally wound about the cylindrical actuator part 22 and a straight radial end portion restricted to a small angle of movement in a recess 26 of the casing 1.

The axially terminal part 29 of the actuator member 3 remote from the shoulder screw 18 has a shallow, cylindrical, axially open cavity in which a second actuator member 6 is conformingly received for relative axial and angular movement. Three cylindrical rollers 4 whose axes of rotation are perpendicular to the axis of the guide sleeve 19 are received in equiangularly distributed radial openings of the actuator part 29 with enough clearance to permit their rotation, but preventing significant circumferential movement relative to the actuator member 3. Each roller extends into a shallow recess in a radial wall of the first actuator member 3 and into a much deeper, circumferentially oversized recess in the opposite radial face of the second actuator member 6, the bottom wall of the latter recess being a cam face 35 obliquely inclined relative to the common axis of the guide 5 and the actuator members 3, 6. Only two of the three rollers 4 and associated features are visible in the drawing.

The radial face of the second actuator member 6 directed away from the member 3 carries a backing plate 27 for a brake lining 8 outside the cavity of the member 3. The plate 27 is attached to the second actuator member 6 by a ribbed nail 9 and held in its angular position relative to the member 6 by an integral axial projection 28 engaging a recess in the actuator member 6. A projecting portion 7 of the plate 27 extends radially through an axial guide groove 23 in the guide 5 into a corresponding groove 24 of the casing 1 and thereby prevents relative angular movement of the second actuator member 6, the guide 5, and the casing 1. The casing is further secured against rotation by a radial projection 25 on the guide sleeve 19 extending into the groove 24.

A plate-shaped portion 11 of the casing 1 is attached to the main part of the casing by bolts, not shown, to bound an opening in which the peripheral portion of the brake disk 21 is received between a brake lining 8 on a backing plate 10 and the afore-mentioned brake lining on the backing plate 27. The backing plate 10 is fastened to the casing portion 11 by a ribbed nail 12. A heavy, helical compression spring 13 is seated in a recess of the casing portion 11 and abuttingly engages the backing plate portion 7 in the groove 24 to bias the two brake linings 8 apart and normally to cause the actuator member 6 abuttingly to engage the actuator member 3, and to push the latter against the flange of the bushing 2. The spring 13 also normally holds the main portion of the casng 1 in the illustrated limiting axial position.

As is conventional in itself and not shown, the Bowden cable 32 leads to a manually operated lever on the handle bar of the bicycle. When the non-illustrated lever is tilted manually to shift the arm 16 from the releasing position shown in broken line in FIG. 1 to the braking position illustrated in fully drawn lines, the first actuator member 3 is turned from the position seen in FIG. 2. The rollers 4 are thereby moved circumferentially along the cam faces 35 on the angularly fixed second actuator member 6, and the latter is shifted to the left, as viewed in FIG. 2. When such movement is impeded by engagement of the friction lining on the plate 27 with the brake disk 21, the first actuator member 3 shifts the casing 1 to the right until the disk 21 is clamped between the two friction linings 8. When the non-illustrated lever on the handle bar of the bicycle is released, the spring 24 pushes the linings 8 apart, and the brake returns to the illustrated position in which the disk 21 does not exert an axial force on either lining 8.

The releasing position of the operating arm 16 is fixed by abutment of the arm against the casing 1. The braking position shifts as the linings 8 are worn down. Before the brake can become ineffective, a condition is reached in which the angular movement of the actuator member 3 toward the braking position is impeded by the friction spring 15. The spring 17 is chosen to yield when the combined resistance of the friction linings 8 and of the spring 15 exceeds a certain value. The clutch constituted by the ribs and recesses 14 is disengaged by the overload, and the resulting angular movement of the arm 16 relative to the actuator member 3 resets the path of the arm 16 to compensate for the wear of the linings 8 without intervention by the operator of the bicycle.

Because all dimensionally critical surfaces in the brake mechanism are cylindrical, the elements of the mechanism are produced to close tolerances by relatively simple and inexpensive machining operations. They are rugged and have a long useful life without requiring maintenance during the useful life of the brake linings which are automatically adjusted to compensate for their wear. Access of contaminants to the rollers 4 and the adjacent interfaces of the casing 1 and the actuator members 3, 6 is prevented by the casing 1 partly enveloping the guide sleeve 19 and by the backing plate 27 sealingly engaging the actuator member 3 when the brake is idle.

Figure 3:
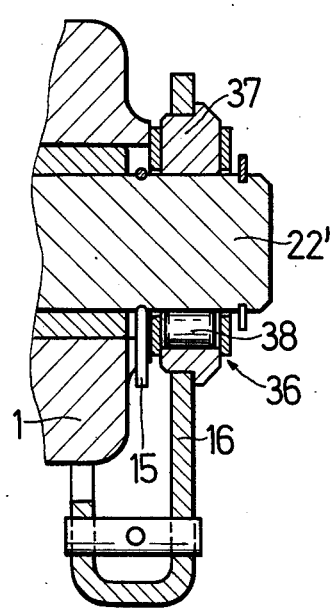
FIG. 3 shows a partial modification of the device of FIG. 2 in a corresponding, fragmentary view on a larger scale.

Other overload-responsive clutches may be interposed between the actuator elements and the operating mechanism instead of the simple arrangement shown in FIG. 2. FIG. 3 shown a clutch 36 in which cylindrical clamping rollers 38 are each received in a wedge-shaped recess of an outer clutch ring 37 fixed on the arm 16 and radially bounded by an inner, cylindrical ring constituted by a correspondingly modified part 22' of an otherwise unchanged first actuator member, a friction spring 15 limiting the angular movement of the actuator member as described above. As is not explicitly shown, but conventional in itself, the rollers 38 are spring-biased toward simultaneous engagement with both rings 22', 37.

The friction spring 15, in this instance, limits the movement of the actuator member 3 toward the released position whereas the arm 16 can move until it abuts against the casing 1. If wear of the linings 8 lengthens the path of the arm 16 until the arm can still move while the actuator member 3 is held fast by the spring 15, the clutch 36 disengages and permits adjustment of the relative angular position of the arm and actuator member. The clutch 36 is engaged again upon inception of the next braking movement of the arm 16.

Other variations in the illustrated disk brake will readily suggest themselves to those skilled in the art. It should be understood, therefore, that the foregoing disclosure relates only to preferred embodiments of the invention, and that it is intended to cover all changes and modifications of the examples of the invention chosen herein for the purpose of the disclosure which do not constitute departures from the spirit and scope of the invention set forth in the appended claims.

What is claimed is:

1. a disk brake comprising:
   a. a support including a tubular guide bounding a passage,
      1. said passage having an axis, being of circular cross section and axially open;
   b. a disk member mounted on said support for rotation in a plane transverse to said axis;
   c. first and second actuator members mounted in said passage for axial movement;
   d. operating means for angularly moving said first actuator member about said axis;
   e. securing means securing said second actuator member against angular movement about said axis;
   f. cam means interposed between said actuator members for moving said second actuator member axially in said passage in response to said angular movement of the first actuator member;
   g. a casing mounted on said first actuator member for limited axial movement and partly enveloping said guide,
      1. said casing being formed with an opening in said plane receiving a portion of said disk member; and
   h. engagement means on said casing and on said second actuator member having respective engagement faces receiving said portion of said disk member axially therebetween for braking engagement when said first actuator member is moved by said operating means.

2. A brake as set forth in claim 1, whereinsaid engagement means include respective brake linings on said casing and on said second actuator member in said opening.

3. A brake as set forth in claim 2, wherein a portion of said first actuator member projects axially outward of said casing, and said operating means include an operating member fastened to the projecting portion of said first actuator member.

4. A brake as set forth in claim 3, wherein said first actuator member has an outer face of circular cross section movably engaging said guide in said passage, said first actuator member being formed with a cavity guidingly receiving said second actuator member for relative axial and angular movement.

5. A brake as set forth in claim 3, wherein said cam means include a plurality of rollers axially interposed between said actuator members, one of said actuator members being formed with respective recesses receiving said rollers for rotation about respective axes of rotation radial relative to the axis of said passage and limiting movement of said rollers transverse to the respective axes of rotation, the other actuator member having respective cam face portions engaging said rollers, said cam face portions being obliquely inclined relative to said axis of said passage.

6. A brake as set forth in claim 3, further comprising means substantially preventing angular movement of said casing relative to said guide about said axis.

7. A brake as set forth in claim 6, further comprising yieldably resilient means interposed between said casing and said second actuator member for biasing said brake linings axially away from each other.

8. A brake as set forth in claim 1, wherein said operating means include an operating member, overload-responsive clutch means connecting said operating member to said first actuator member for joint angular movement of the connected members when the resistance of said first actuator member to force transmitted by said clutch means is below a predetermined value while permitting angular movement of said operating member relative to said first actuator member when said force exceeds said value, and brake means limiting angular movement of said first actuator member.

9. A brake as set forth in claim 8, wherein said first actuator member and said operating member have respective faces radially extending relative to said axis, said clutch means including projections and recesses on said faces, and yieldably resilient means urging interengagement of said projections and recesses.

10. A brake as set forth in claim 8, wherein said clutch means include a clamping roller clutch.

* * * * *